Aug. 14, 1956     W. M. BROOKS     2,758,865
SEAL
Filed Feb. 25, 1953     2 Sheets-Sheet 1
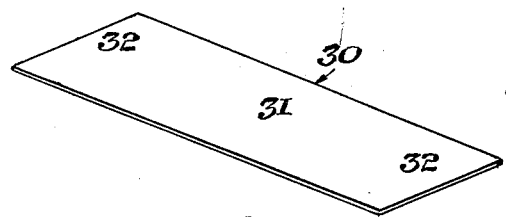
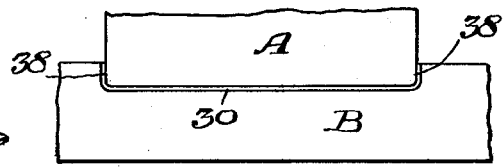
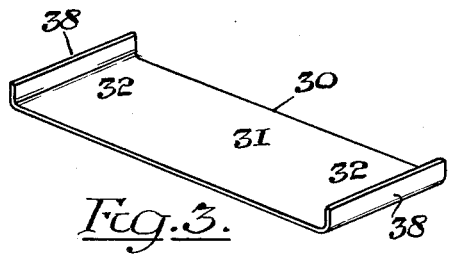
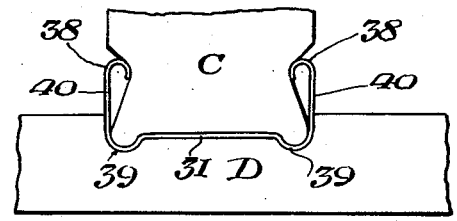
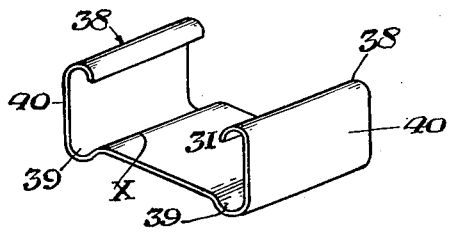
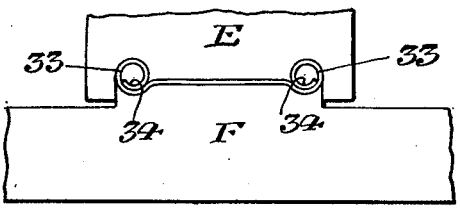
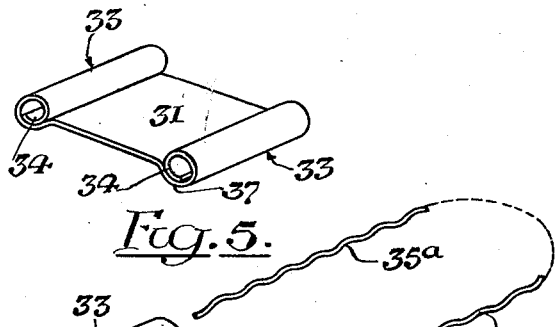
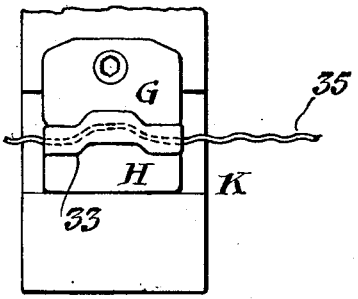
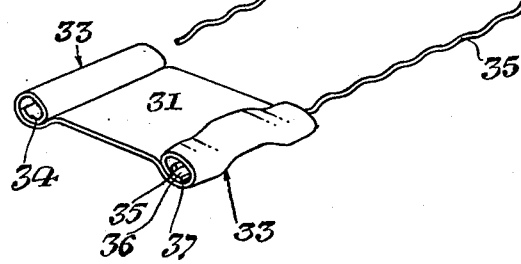
Inventor:
Winfred M. Brooks
by his Attorney Aug. 14, 1956 W. M. BROOKS 2,758,865
SEAL
Filed Feb. 25, 1953 2 Sheets-Sheet 2
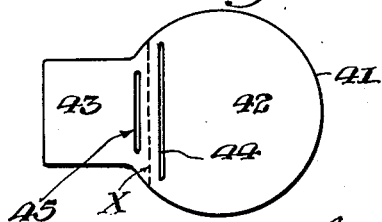
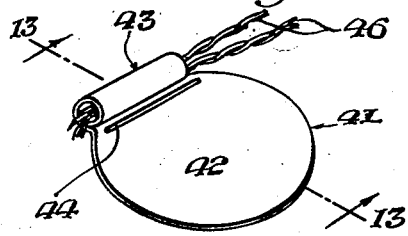
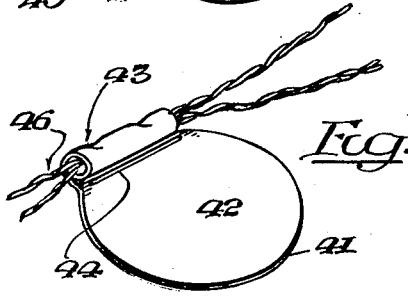
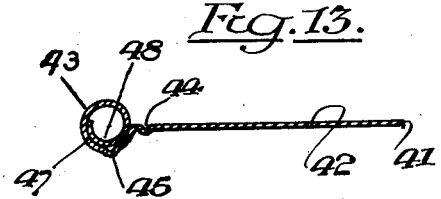
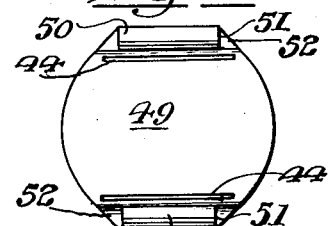
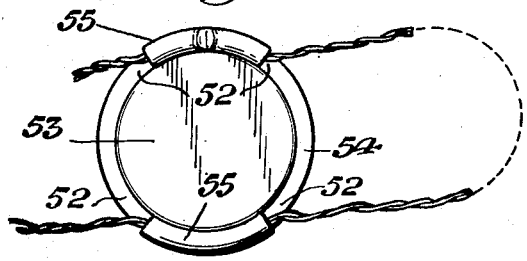
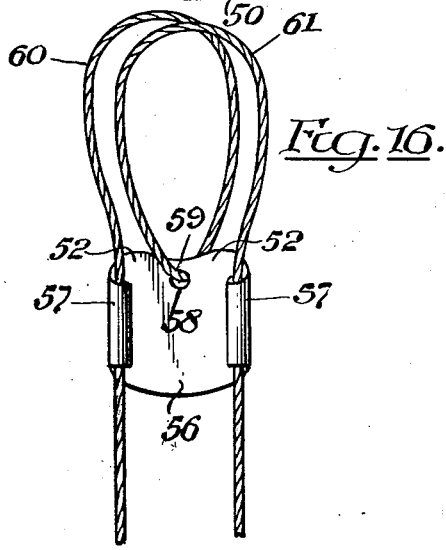
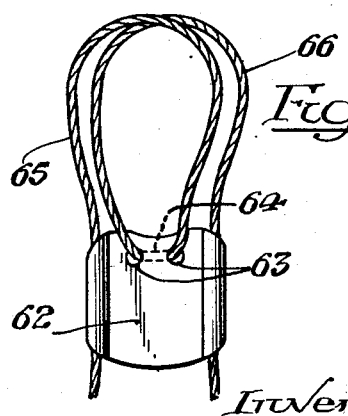
Inventor:
Winfred M. Brooks
by his Attorney

United States Patent Office 2,758,865
Patented Aug. 14, 1956

2,758,865

SEAL

Winfred M. Brooks, West Orange, N. J., assignor to E. J. Brooks Company, Newark, N. J., a corporation of New Jersey Application February 25, 1953, Serial No. 338,775

1 Claim. (Cl. 292—325)

The present invention relates to a seal composed of sheet-material and strand or equivalent tying material.

The main object of the invention is to produce a seal that is deceptively simple in appearance but which has the property of delaying, and even of frustrating, the opening of the seal by an unauthorized person, and to make it difficult, if not impossible, to reclose the seal without leaving evidence of tampering.

The invention consists, broadly speaking, in a seal which gives the appearance of having tying material enclosed within a single fold of the wing portion of a sealing element of sheet-material, but which is provided both with an inner and an outer fold so constructed and arranged that the opening of the outer fold will not release the strand-material held by the inner fold. Other features of invention will appear as the specification proceeds.

Figs. 1 to 5 inclusive are perspective views showing the method of producing the seal;

Figs. 6 to 8 inclusive show the action of the various die members used in coiling a wing portion of a blank of sheet-material;

Fig. 9 is a view of the sealing tool for flattening and crimping the coiled wing portion after the tying material has been introduced endwise thereinto, this view being at right angles to the showing in Figs. 6 to 8;

Fig. 10 is a plan view of a blank showing a modified form of the invention;

Fig. 11 is a view of the blank of Fig. 10 with the wing portion coiled upon itself;

Fig. 12 shows stranded tying material introduced endwise into the coiled wing portion, and said wing portion flattened and crimped;

Fig. 13 is a fragmentary, sectional view on the plane of line 13—13 of Fig. 11;

Fig. 14 is a plan view of a different form of sheet-material sealing element, showing the provision of a guide-wall to facilitate threading strand-material through the coil;

Fig. 15 is a plan view of a seal having a circular shape;

Fig. 16 shows a seal to be used in connection with a coin-bag, said seal embodying the invention hereof; and Fig. 17 is a view similar to Fig. 16 but showing a slightly modified form of the sheet-material sealing element.

Considering first the general aspects of the invention: 30 (Fig. 1) indicates a blank of sheet-material which may be of any suitable shape but, as here shown, is of rectangular form. Said blank consists of a main portion 31 and one or more wing portions 32, which latter here form continuous extensions of said main portion. Each of said wing portions 32 is coiled upon itself to an extent greater than one convolution to thereby provide a coiled wing portion 33 having an interior auxiliary surface 34 for the reception of suitable tying material (see Fig. 4). One end of tying material 35 is now introduced endwise into one coiled wing portion 33 in the plane of auxiliary surface 34, and thereafter said coiled wing portion is flattened and crimped (see Fig. 5), thereby producing an inner fold 36 in which the tying material is held and an outer fold 37 that overlaps the inner fold and is openable independently of said inner fold. In actual practice, the form of seal shown in Fig. 5 will, as a rule, be shipped to the user with one end of tying material 35 anchored in the flattened and crimped coiled wing portion, while the other end 35ª is left free so that the shackle formed by such tying material can be threaded through an opening in the article to be sealed, after which the user introduces said free end 35ª into the other coiled wing portion, which latter is then flattened and crimped.

Considering now the invention in greater detail: blank 30 is acted upon by two die members A and B whereby there is imparted to said blank a preliminary curling 38 of the side edges of wing portions 32 thereof (see Figs. 2 and 6). The blank, as thus modified, is now subjected to the action of die members C and D, whereby the wing portions aforesaid are shaped into open and substantially semicircular trough-sections 39 and upstanding-sections 40 with the preliminary curled side edges 38 becoming slightly more curled and located opposite trough-sections 39 (see Figs. 3 and 7). The blank, as thus shaped, is then subjected to the action of die members E and F, whereby upstanding-sections 40 and the preliminary curled side edges 38 are formed into coiled wing portions 33, and it will be noted, as previously described, that said coiled wing portions are curled to a greater extent than one convolution (see Figs. 4 and 8). Tying material 35 is now introduced endwise into one of the coiled wing portions 33 and the latter is then subjected to the action of jaws G and H of a sealing tool K, whereby the flattening and crimping operation is performed (see Figs. 5 and 9). In subjecting the coiled wing portion to the flattening and crimping step, inner fold 36 will tend to slide over the inner surface of outer fold 37 so as to embrace tying material 35 more completely.

Referring to Figs. 3 and 7, it will be seen that there is what may be called a line of demarcation of main and wing portions 31 and 32 of the sheet-material sealing element. This line of demarcation is indicated by X. Adjacent this line the sheet-material sealing element will preferably have a weakened zone or scoring. Such weakened zone can be on one side or the other of the line of demarcation or there can be such a zone on both sides thereof. Referring now to Fig. 10, 41 indicates a sheet-material blank similar to blank 30 of Fig. 1 though somewhat differently shaped. In the present instance, the sheet-material sealing element consists of a main portion 42 and a wing portion 43. X indicates the line of demarcation of the main and wing portions. If weakened zones are to be incorporated in the sheet-material sealing element, this will be done at the time the blank is produced, that is before the wing portion is coiled upon itself. As here shown, there are two weakened zones 44 and 45, one on each side of demarcation line X, 44 being on main portion 42 and 45 being on wing portion 43. These weakened zones may be produced in several ways, either by interrupted or continuous scorings, but in the present case it is preferred to have continuous scorings as shown, which, however, do not extend the entire distance across the blank but terminate short thereof, the object of which is to avoid premature rupture of the sealing element while in transit to the user. The wing portion is now coiled upon itself in the manner previously shown in Figs. 2 to 4 inclusive, after which tying material is introduced endwise into the coiled wing portion, as previously described in connection with Fig. 5. Fig. 11 shows the assembled parts before the flattening and crimping step has taken place, and, since the sealing element has only one coiled wing portion, both ends of tying material 46 are introduced endwise into the same coiled wing portion. Fig. 12 shows the coiled wing portion flattened and crimped. Fig. 13 shows an enlarged cross sectional fragmentary view on the line 13—13 of Fig. 11. From this it will be seen that scoring 45 on the wing portion will be on the inside of outer fold 47 and will not be readily apparent.

A person may, of course, attempt to tamper with the seal in various ways, but it will be sufficient to describe only one form of attempted tampering. If he believes that the tying material is held by a single fold of the sheet-material member, he may attempt to open the seal by unfolding the coiled, flattened and crimped wing portion. If he is successful in so doing, he will be baffled by the fact that the strand-material is still held by inner fold 48. Further manipulation will tend to break the sheet-material element at either weakened zone 44 or 45. When this happens, the seal cannot, of course, be reclosed, and it will be obvious that tampering has taken place. Furthermore, whether the sheet-material element breaks at zone 44 or 45, the wing portion, or inner fold 48 thereof, will still surround and firmly clasp the tying material. Inasmuch as the opening in the sealed article, through which the tying material is threaded before introducing it endwise into the coiled wing portion, is but slightly larger than the tying material, the fact that the coiled wing portion or the inner fold thereof still surrounds and clasps the tying material will prevent the latter from being passed back through the opening in the sealed object.

It will be apparent that either the single or double scoring, as described in connection with Figs. 10 to 13 inclusive, can be utilized in connection with the form of the invention shown in Figs. 1 to 5 inclusive, and it has only been described separately therefrom for the purpose of clarity.

Fig. 14 shows a slightly different form of the sheet-material sealing element. As there indicated, main portion 49 is provided with one or more wing portions 50, but it will be seen that coil 51 of said wing portion does not extend the entire distance across the element. This leaves a guide-wall 52 to facilitate the threading of tying material through the coil. Such guide-walls are also shown at 52 in Figs. 15 and 16.

The shape of the sheet-material sealing element may take many other forms. As shown in Fig. 15, blank 53 is of circular shape and has a circumferential lip 54 from which extends one or more wing portions 55. The coiled wing portions 55 are produced in a manner which is very similar to that described in connection with other forms of the invention; the die members used, however, being suitably curved to give the illustrated arcuate shape to said wing portions.

It will be apparent that the present invention can be embodied in seals that are used for many purposes. The seal shown in Fig. 5 can be used to seal a loop around the neck of a coin-bag, in which case the tying material would preferably be cord instead of wire. If it is desired to have a double loop for a coin-bag, then the form of the invention shown in Figs. 16 and 17 can be employed. As shown in Fig. 16, 56 indicates the main portion of a sheet-material sealing element provided with two coiled wing portions 57 and having a transverse opening 58. Strand-material 59 is anchored in transverse opening 58 and one end is formed into a loop 60 and threaded through one coiled wing portion, while the other end of the strand-material is formed into loop 61 that is then threaded through the other coiled wing portion. After the two loops have been tightened around the mouth of the bag, a sealing tool will be applied to flatten and crimp the coiled wing portions.

Fig. 17 is substantially the same as Fig. 16 except that here main portion 62 is provided with two transverse openings 63 in which strand-material 64 is anchored. One end of the strand-material is now formed into a loop 65 and is threaded through one of the coiled wing portions, the other end of the strand-material being formed into another loop 66 and being threaded back through the other one of the coiled wing portions.

For a full disclosure of the use of seals in connection with coin-bags, reference is made to my prior Patent No. 2,599,318.

I claim:

A sealing device comprising a sheet-material sealing element and a length of tying material; said sealing element having a flat main portion and tubular coiled portions, each with an inner fold and an outer fold, at opposite marginal parts of said main portion; one portion of said tying material being within and in fixed relation to one of said coiled portions and the other of said coiled portions being adapted to receive endwisely thereinto another portion of said tying material and to be tightened upon the latter to hold it fixedly therewithin; and said sealing element having a separate line of weakness therein substantially parallel to the longitudinal axis of each of said coiled portions and in the outer fold of each of said coiled portions where said outer fold is in overlapping relationship to said inner fold, and adjacent to and substantially parallel to the juncture of each of said coiled portions with said main portion; said lines of weakness being adapted to induce breakage of said sealing element in the presence of forces tending to uncoil either of said coiled portions.

References Cited in the file of this patent

UNITED STATES PATENTS

| | | |
|---|---|---|
| 235,668 | Brooks | Dec. 21, 1880 |
| 745,036 | Brooks | Nov. 24, 1903 |
| 800,544 | Brooks | Sept. 26, 1905 |
| 1,517,670 | Dietze | Dec. 2, 1924 |
| 1,537,741 | Brooks | May 12, 1925 |
| 2,097,079 | Perquin | Oct. 26, 1937 |
| 2,196,206 | Foss | Apr. 9, 1940 |
| 2,362,909 | Lind et al. | Nov. 14, 1944 |
| 2,371,414 | Stelzer | Mar. 13, 1945 |
| 2,599,318 | Brooks | June 3, 1952 |

FOREIGN PATENTS

| | | |
|---|---|---|
| 389,268 | Great Britain | Mar. 16, 1933 |